US 6,560,243 B1

United States Patent
Mogul

(10) Patent No.: US 6,560,243 B1
(45) Date of Patent: May 6, 2003

(54) SYSTEM AND METHOD FOR RECEIVER BASED ALLOCATION OF NETWORK BANDWIDTH

(75) Inventor: Jeffrey Clifford Mogul, Menlo Park, CA (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/302,781

(22) Filed: Apr. 30, 1999

(51) Int. Cl.⁷ .................................................. H04J 3/16
(52) U.S. Cl. ..................... 370/468; 370/229; 370/234; 370/329; 370/352; 370/231; 370/412; 370/437
(58) Field of Search .......................... 370/229, 231–240, 370/329, 252, 253, 412, 413, 414, 415, 418–420, 437, 468

(56) References Cited

U.S. PATENT DOCUMENTS

| | | | | |
|---|---|---|---|---|
| 6,023,453 A | * | 2/2000 | Ruutu et al. ................. | 370/229 |
| 6,041,039 A | * | 3/2000 | Kilkki et al. ................ | 370/230 |
| 6,078,564 A | * | 6/2000 | Lakshman et al. ........... | 370/235 |
| 6,119,235 A | * | 9/2000 | Vaid et al. ................... | 713/201 |
| 6,167,030 A | * | 12/2000 | Kilkki et al. ................ | 370/236 |
| 6,201,791 B1 | * | 3/2001 | Bournas ...................... | 370/234 |
| 6,285,658 B1 | * | 9/2001 | Packer ........................ | 370/230 |
| 6,338,046 B1 | * | 1/2002 | Saari et al. .................. | 370/236 |
| 6,404,738 B1 | * | 6/2002 | Reininger et al. ........... | 370/236 |
| 6,412,000 B1 | * | 6/2002 | Riddle et al. ................ | 370/230 |
| 6,437,758 B1 | * | 8/2002 | Nielsen et al. ............... | 345/7 |
| 6,438,141 B1 | * | 8/2002 | Hanko et al. ................ | 370/252 |
| 6,452,935 B1 | * | 9/2002 | Gibbs ......................... | 370/437 |

OTHER PUBLICATIONS

Packeteer, Inc, 1998, "Controlling TCP/IP Bandwith," *TCP/IP Bandwidth Management Series In: The Packeteer Technical Forum* No. 1 of 3: 3–14.

Peterson and Davie, *Computer Networks: A Systems Approach*. Morgan Kaufmann Publishers, Inc., 1996. San Francisco, California, Chapter 8, pp. 392–394.

Stevens, *TCP/IP Illustrated, vol. 1: The Protocols*. Addison Wesley Longman, Inc, 1994. Reading, Massachusetts, pp. 223–322.

* cited by examiner

*Primary Examiner*—Douglas Olms
*Assistant Examiner*—Van Nguyen
(74) *Attorney, Agent, or Firm*—Gary S. Williams; Pennie & Edmonds LLP (57) ABSTRACT

A system receives a flow of data packets via the link and determines a target bandwidth to be allocated to the flow on the link. In response to the flow, the receiving system transmits data to the sending system. The transmitted data control the sending system such that when the sending system transmits subsequent data packets to the receiving system, such subsequent data packets are transmitted at a rate approximating the target bandwidth allocated to the flow. In one embodiment, the rate at which the transmitted data from the receiving system arrive at the sending system determines the rate at which the sending system transmits the subsequent data packets. The receiving system can control the rate by delaying its response to the sending system according to a calculated delay factor. In another embodiment, the data transmitted from the receiving system to the sending system indicate a maximum amount of data that the receiving system will accept from the sending system in a subsequent data transmission. The maximum amount is determined so that when the sending system transmits subsequent data packets according to that amount, data is transmitted by the sending system to the receiving system at a rate approximating the target bandwidth.

24 Claims, 5 Drawing Sheets

SYSTEM AND METHOD FOR RECEIVER BASED ALLOCATION OF NETWORK BANDWIDTH

The present invention relates to the field of system networks, and, more particularly, to a method and apparatus for allocating bandwidth to systems transmitting data over a communication link in a network.

BACKGROUND OF THE INVENTION

In a network, such as the Internet or an Intranet, in which many systems are coupled to each other by communication links, some links may be overused, that is, the demand for bandwidth over a particular link exceeds the bandwidth that is actually available. Often, this demand results from several data flows, possibly originating from multiple sources competing for the available bandwidth. Accordingly, it is desirable to enforce a specific policy for allocating the available bandwidth among the competing sources.

Typically, the bandwidth allocation policy is performed either at the systems sending the data flows or at intermediate routers in the network. Examples of mechanisms for allocating bandwidth among data flows include "fair queuing", "weighted fair queuing", and "virtual clock". Some of these approaches aim at achieving simple fairness among flows, while others can favor one data flow over another.

Such approaches, however, are inadequate when the system receiving the data flows wants to prioritize those data flows. For one, the sending system may not be aware of the desired priorities of the receiving system, and thus send data contrary to those priorities. Further, if multiple sending systems are sharing the link, it can be quite difficult for the sending systems to coordinate their bandwidth allocation policies to match the bandwidth allocation desired by the receiving system, particularly if these sending systems do not have a mutually agreed upon framework for expressing priorities.

One example of such a situation would be a Web proxy server, between an organization and the Internet, which is connected to the Internet via an overutilized link. The proxy operator may wish to give higher priority to retrievals requested by specific users.

Another example is a Web browser with several active windows, one of which is conveying low-priority periodic status updates, and the other is used for explicit requests for information. If the browser is connected via a slow link (such as a modem), the user may want to give priority to responses to the explicit requests, instead of the status updates.

Thus, there remains a need for a method and an apparatus that enables a receiving system to achieve its own bandwidth allocation policy among multiple sending sources sharing a communication link.

SUMMARY OF THE INVENTION

An object of the present invention is to give the receiver of flows of data packets the capability to control the bandwidth allocation among multiple users of a network sharing a common communication link. Thus, the receiver can enforce its own bandwidth allocation policy without the need of flow-setup protocols or having to communicate the bandwidth policy to routers in the network. Further, the invention has the advantage of not necessarily requiring changes to existing sending systems or routers.

The present invention relates to methods and systems for allocating bandwidth on a communication link in a network operating according to a flow-controlled protocol where a receiving system receives a flow of data packets from a sending system via the communication link. The receiving system determines a target bandwidth to be allocated to the flow on the link and transmits data to the sending system. The transmitted data provides feedback to the sending system such that when the sending system transmits subsequent data packets to the receiving system in response to the transmitted data, data is transmitted by the sending system to the receiving system at a rate approximating the target bandwidth.

In one embodiment of the method, the data transmitted by the receiving system to the sending system acknowledges receipt of a particular data packet in the flow of data packets.

In another embodiment of the method, the data transmitted from the receiving system to the sending system indicate a maximum amount of data that the receiving system will accept from the sending system in a subsequent data transmission. The maximum amount is determined so that when the sending system transmits subsequent data packets according to that amount, data is transmitted by the sending system to the receiving system at a rate approximating the target bandwidth.

In still another embodiment of the method, a rate at which the transmitted data from the receiving system arrive at the sending system determines the rate at which the sending system transmits the subsequent data packets.

In still yet another embodiment, the method calculates a period of time for which the receiving system does not transmit data to the sending system. The delay is from when the receiving system would normally transmit the data operating according to the network protocol. The transmission of subsequent data packets on the link by the sending system is thereby delayed for the period of time, causing the data transmission rate of the sending system to approximate the target bandwidth on the link allocated to the flow. In one embodiment of the invention, the method assigns the flow to a class of flows, and the calculated period of time applies to each flow in that class.

The invention may be implemented in a system including a network interface for receiving a flow of data packets from a sending system on the network via the link. A processor, coupled to the network interface, determines a target bandwidth to be allocated to the flow on the link. The network interface transmits data to the sending system in response to receiving the flow of data packets. The data transmitted by the interface controls the sending system such that the sending system transmits subsequent data packets at a rate corresponding to the target bandwidth allocated to the flow.

Other objects, features, and advantages of the present invention will become apparent in the course of the following description and by reference to the accompanying drawings.

DETAILED DESCRIPTION OF PREFERRED EMBODIMENTS

Figure 1:
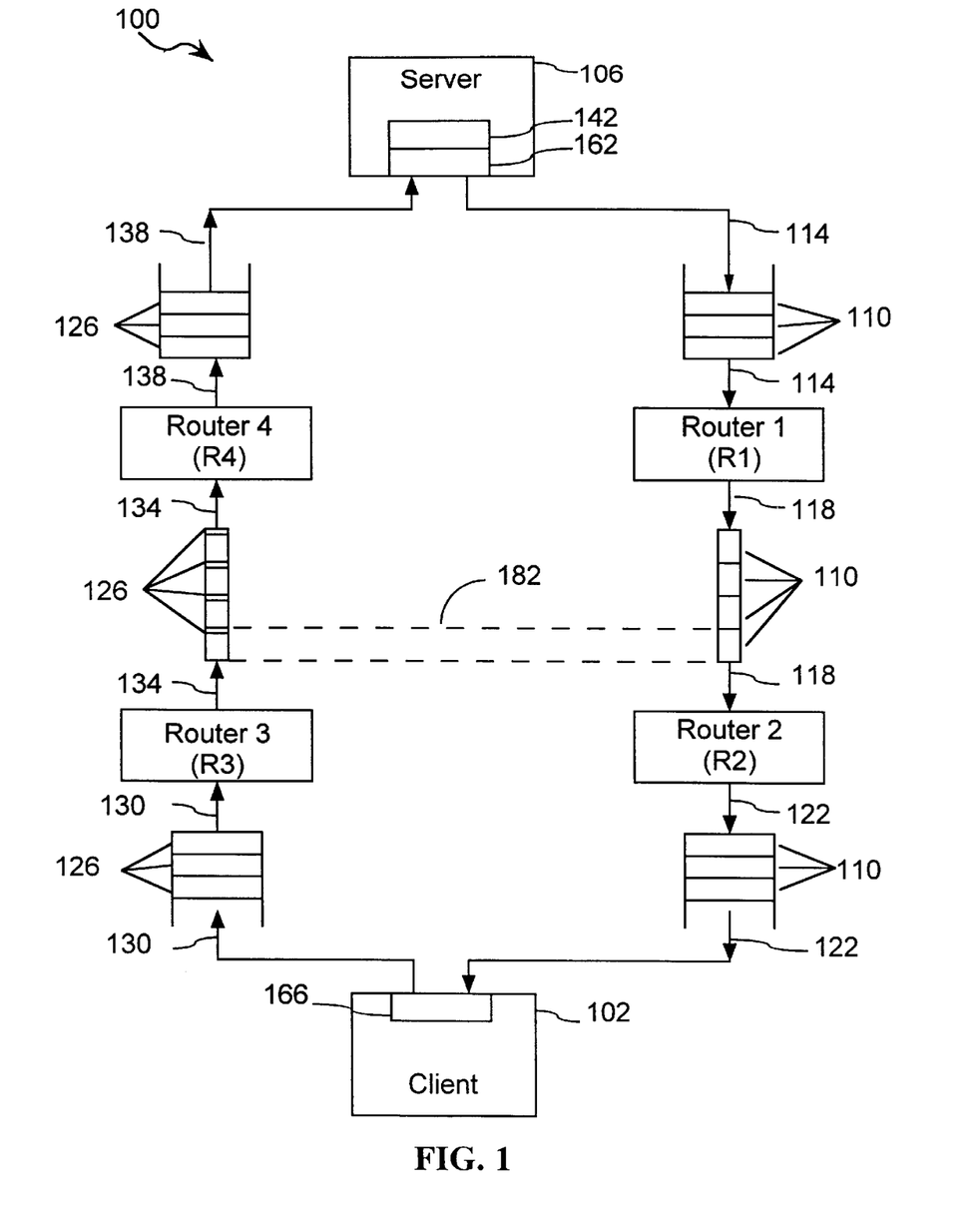
FIG. 1 is a block diagram of a system network illustrating an exemplary embodiment of the invention.

FIG. 1 shows an exemplary embodiment of a network 100 in which a client system 102 allocates link bandwidth to a server system 106 according to the principles of the invention. The network 100 can be for example, the Internet, which is a worldwide, public network of computer systems and devices operated and maintained by various organizations; or, as another example, the network 100 can be an intranet, which is typically a private network of computer systems operated by a single organization.

In this exemplary embodiment, the client 102 and the server 106 communicate with each other via two network paths. One network path includes a router R1 and a router R2 for transmitting data packets 110 sent by the server 106 to the client 102. On this network path, the server 106 is coupled to the router R1 by a communication link 114, router R1 to router R2 by communication link 118, and router R2 to the client 102 by communication link 122.

The other network path includes a router R3 and a router R4 for transmitting acknowledgment packets (ACKs) 126 from the client 102 to the server 106. On this return path, the client 102 is coupled to the router R3 by a communication link 130, router R3 to router R4 by communication link 134, and router R4 to the server 106 by a communication link 138. In one aspect of this embodiment, the forward and return paths may be the same; that is, router R1 and router R4 are the same router, as are routers R2 and R3. Further, depending upon the network protocol used by the systems to communicate, there may be no formal distinction between acknowledgment packets 126 and data packets 110.

The server 106 includes buffer memory 142 for storing copies of data packets 110 sent but not yet acknowledged by the client 102. In order to communicate with each other, the server 106 and the client 102 each have a network interface 162, 166, respectively.

Figure 2:
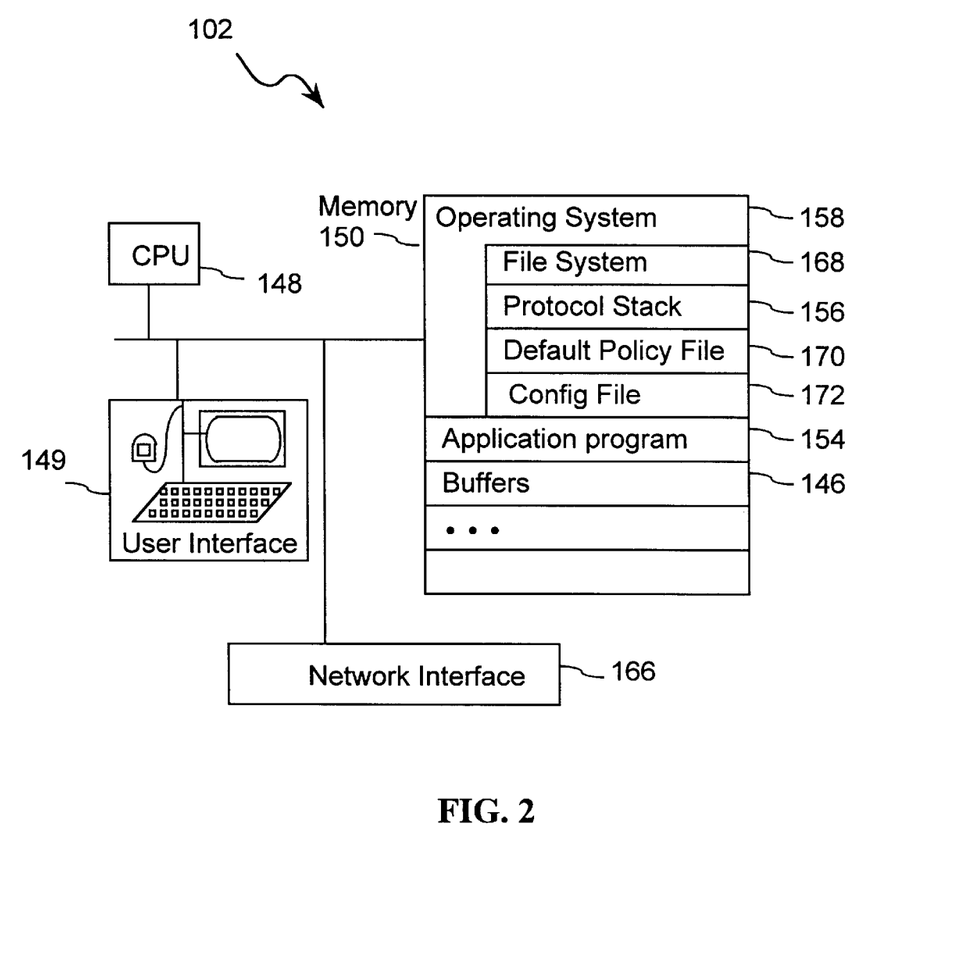
FIG. 2 is a block diagram illustrating the client system.

In FIG. 2, the client 102 includes a processor or CPU 148, user interface 149 and memory 150 for storing application program 154 and operating system 158. The operating system 158 preferably includes a file system 168, a protocol stack 156, a default policy file 170 and a bandwidth allocation configuration file 172. The client 102 also has buffer memory 146 for storing data packets 110 received over the network 100 but not yet read.

Examples of application program 154 are Web browsers that implement rules for data transfer between computers, such as the Hypertext Transfer Protocol (HTTP) or the File Transfer Protocol (FTP). The operating system 158 is a program or set of programs that provides basic services used by the application program 154 that run on the CPU 148. The file system 168 provides program files to operating system 158. The default policy file 170 provides default bandwidth allocation policies for use by the operating system 158 or protocol stack 156 when determining the target bandwidth of data flows. For instance, the default bandwidth allocation policy may automatically classify data flows into various classes based on their duration and actual (monitored) bandwidth usage, and then assign a target bandwidth to each data flow based on its assigned class. The configuration file 172 is used to record specific data flow bandwidth allocations and/or bandwidth allocation policies to be used with specified application programs, and thus to override the default bandwidth allocation policies.

To send and receive data, the server 106 and client 102 execute processes of a network protocol. The network protocol organizes the flow of data packets on the network and the format of the data in the data packets. The processes for handling the network protocol are referred to as the protocol stack 156.

Figure 3:
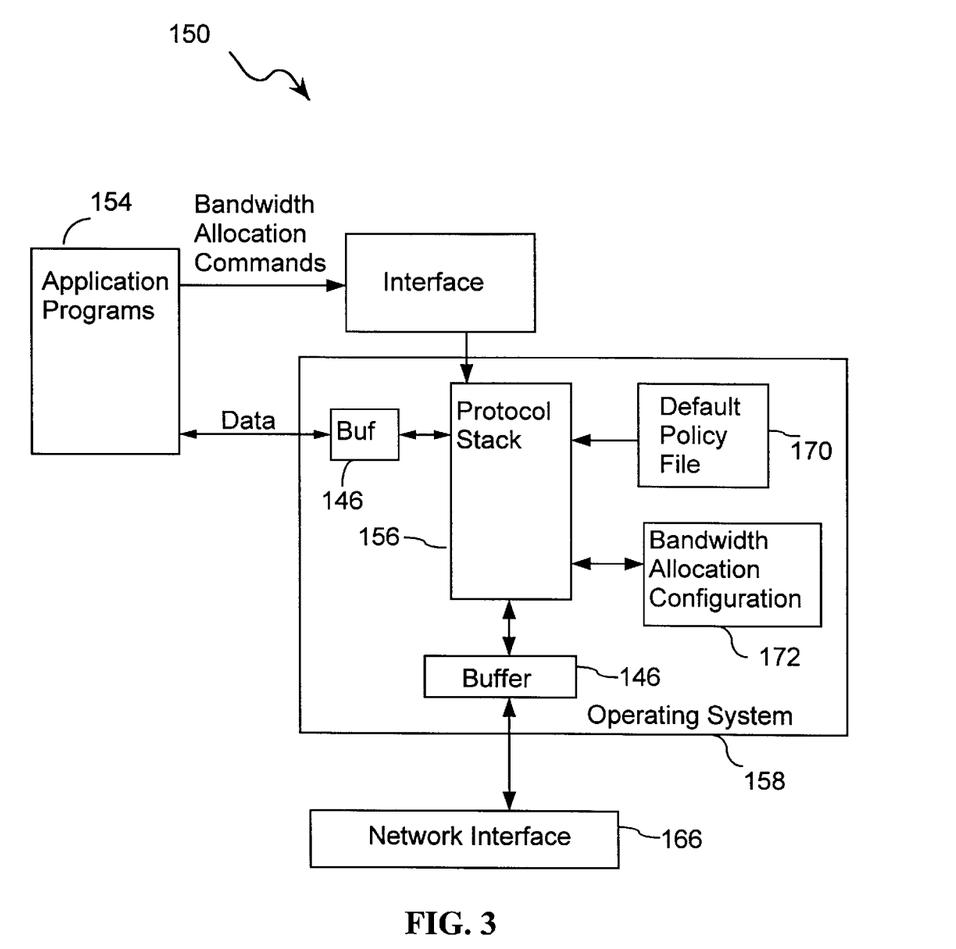
FIG. 3 is a block diagram illustrating the Memory component of the client system.

In FIG. 3, memory 150 of client 102 is illustrated to facilitate the description of the general operation in the exemplary embodiments.

General Operation

Typically, the network protocol used by the systems 106 and 102 will employ a flow-control mechanism. In a flow-controlled network protocol, a sending system (sender) transmits data packets to a receiving system (receiver), and the receiver responds by sending acknowledgment (ACK) packets to the sender. Based on these ACK packets, the sender limits the rate at which to send subsequent data packets to the receiver. For example, in a stop-and-wait flow-control protocol, the sender of a data packet requires an acknowledgment for that packet from the receiver before sending the receiver the next data packet.

Preferably, the server 106 and client 102 of the invention communicate using the Transmission Control Protocol (TCP) as a layer on the Internet Protocol (IP), collectively TCP/IP. Although the invention is described with reference to TCP, any other network protocol that employs a flow-controlled mechanism is suitable for practicing the invention.

Advertised Window

Figure 5:
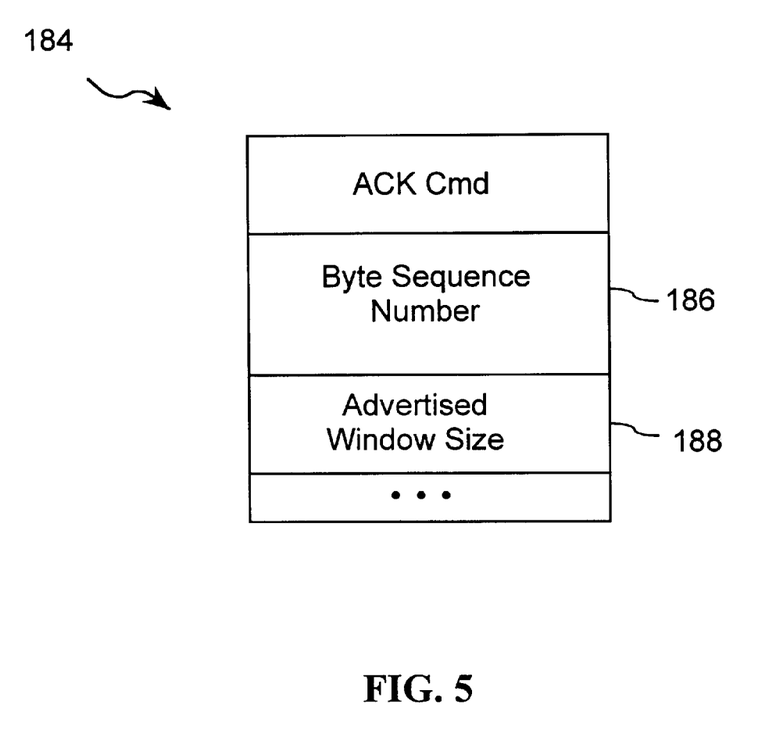
FIG. 5 is a block diagram of an acknowledgment packet.

TCP is a "sliding window" protocol that uses byte-based sequence numbers to identify the bytes in the data stream transmitted from the sender to the receiver. A TCP receiver will only allow a TCP sender to send as much data as the receiver can store in available buffer memory. Referring to FIG. 5, with each returned ACK packet 184, the receiver indicates to the sender the sequence number 186 of the acknowledged byte of data and the amount of data the receiver is willing to accept from the sender, called an "advertised window" 188.

From the advertised window and the acknowledged byte sequence number, the sender determines the highest byte sequence number that can be transmitted. The sender is not permitted to send data beyond this sequence number until the sender receives another acknowledgment from the receiver that increases its advertised window.

The present invention takes advantage of a fundamental feature of a flow-controlled protocol, which is that during steady state operation the ACK transmission rate of the receiver controls the data transmission rate of the sender. The receiver, then, can use the ACK packets to control the bandwidth allocated to the sender by controlling when to issue the ACK packets and by constraining the amount of data the receiver is willing to receive in a subsequent data transmission. The sender, then, can send more data only after receiving an ACK packet in which the receiver has advanced its advertised window.

Normally, the receiver acknowledges data immediately, and consumes the received data as quickly possible. Consequently, the rate at which the receiver advances its advertised window is roughly the rate at which the data arrive at the receiver. This rate of arrival is imposed by the bottleneck link (i.e., the communication link with the lowest bandwidth) on the network path between the sender and the receiver.

To illustrate with the example shown in FIG. 1, the server 106 and the client 102 are in the process of communicating with each other using data packets 110 and ACK packets 126. In this example, the server 106 is the sending system, and the client 102 is the receiving system. Clearly, the roles of the server 106 and client 102 as sender and receiver can be reversed. For illustration purposes only, the transmission rate for the link 118 is slower (i.e., smaller bandwidth) than links 114 and 122, and, consequently, is the bottleneck link on this network path.

When the router R2 forwards the data packets 110 from the bottleneck link 118 to the faster link 122, the data packets 110 have the same temporal spacing as they had on the bottleneck link 118, even though the link 122 has a higher bandwidth. The ACKs 126 on the return network path, also, have the same temporal spacing as the bottleneck link 118, as indicated by the dashed lines 182. Consequently, a steady state TCP flow of data is "self-clocking"; the flow automatically transfers data and ACK packets at approximately the rate imposed by the bottleneck link 118.

Although the self-clocking model is an oversimplification, particularly where data flows from multiple sources share the bottleneck link, the model provides a first approximation of the bandwidth typically allocated to each data flow. When state-of-the-art implementations and routers are used, N flows sharing the bottleneck link will each receive 1/N of the bandwidth of that link.

Determination of Bandwidth Allocation

The receiver of the invention determines a target bandwidth to be given to the sender. The receiver can make this determination according to a policy that defines how the bandwidth of the bottleneck link is to be shared among various concurrent flows. Given a description of the data flow, such as, for example, the flow's source address, the receiver can determine the fraction of bandwidth, B, allocated to that flow according to governing policy. When the bottleneck link is idle, the full bandwidth of the link should be allocated to the flow.

For best performance, the policy should avoid over-committing the available bandwidth of the link, i.e., the sum of the allocations to all flows is not greater than 100% of the bandwidth. The principles of the invention, however, can still be practiced although a particular policy over-commits the link.

In one embodiment of the invention, the particular application program 154 that receives the data determines the bandwidth. That is, the program 154 assigns a target bandwidth to each data flow as that flow is created (or at a subsequent time in the existence of that flow) and communicates this target to the operating system 158 or protocol stack 156.

In other embodiments of the invention, the operating system 158 or protocol stack 156 determines the bandwidth directly, based on information provided by a default policy file 170 in the operating system 154 through an user interface, matched against the particular parameters of the flow (such as the identification of the sender or the protocol type). For example, the default policy file 170 may inform the operating system 158 (or protocol stack 156) that all HTTP flows arriving from a given system X are to be assigned a low target bandwidth BX, and that all FTP flows arriving from a given system Z are to be assigned a high target bandwidth BZ. Changes to existing application program 154 would be unnecessary for such embodiments.

Congestion Window

Modern TCP implementations of data transmitting systems include a congestion avoidance and control mechanism called a "congestion window". The congestion window is an estimate of the amount of data that can be unacknowledged at one time without congesting the network. The congestion window is initialized to a small value, such as, for example, one packet or 4 Kbytes.

In the initial "slow-start" phase, the congestion window is increased by the size of one segment (i.e., the maximum allowed packet size) when each ACK is received. After the size of the congestion window reaches the "slow-start threshold", the congestion window increases by the size of one segment for each elapsed round-trip time.

Packet losses cause a decrease in the congestion window and in the slow-start threshold. Until the congestion window reaches the size of the receiver buffer 146, the data transmission rate of the sender is controlled more directly by the rate at which it receives acknowledgments rather than the increase in the receiver's advertised window. In general, the sender sends no more data than are allowed by the more restrictive of the congestion window or the advertised window of the receiver, presuming that the size of the server buffer 142 is not more restrictive than both windows.

Referring back to FIG. 1, during steady state operation, the bandwidth used by the data flow from the server 106 is approximately the advertised window size of the client 102 divided by the round-trip time. The client 102, then, can achieve the target bandwidth for the flow by adjusting the advertised window size or the round-trip time or both.

Varying the Advertised Window Size

In one embodiment of the invention, the client 102 uses the size of the advertised window to control the data transmission rate of the server 106. In the ACK packets 126, the client 102 indicates the amount of data it will accept from the server 102 in a subsequent data packet transmission. This amount is calculated to achieve the target bandwidth when the server 106 transmits subsequent data packets in response to the ACK packets 126.

Through use of advertised windows, the client 102 can either increase or decrease the rate at which the server 106 transmits data in order to achieve the target bandwidth. The client 102 can attain a decrease in rate by shrinking the window size advertised to the server 106. The client 102 can increase the transmission rate of the server 102 by shrinking the window size advertised to other data flow sources that are concurrently using the bottleneck link 118. In this event, the server 106 would gradually discover bandwidth made available by the decreased activity of the other data flow sources.

Another way to increase the transmission rate is for the client 102 to increase the window size advertised to the server 106. This might, however, over-commit the link bandwidth, increasing congestion on the link and leading to a shrinking of the congestion window of the server 106.

Presumably, the advertised window size is less than both the sender buffer size and the congestion window size, otherwise varying the advertised window size has no effect on the data transmission rate of the sender 106. Thus, varying the advertised window size might not be useful for making small adjustments to the bandwidth or for a congested network path. Further, making the window size too small, for example, below two segments, can produce bursty transmissions and excessively low bandwidth. Varying the advertised window, however, to a reasonable value could help maintain the steady-state behavior of the flow, which, in turn, could increase the congestion window of the server 106 indefinitely.

To control bandwidth allocation, the client 102 can use the technique of adjusting the advertised window independently of or together with the technique of "delay-extended" acknowledgements of the invention, described below. Similarly, the client 102 can use delay-extended acknowledgments to allocate bandwidth independently of the advertised window technique.

Delay-Extended Acknowledgments

Delaying the transmission of ACK packets 126 to the server 106 is another technique by which the client 102 can control the server data transmission rate. The delay is imposed from the time when the client 102 would normally transmit the ACK 126, that is, immediately upon receiving the data packet. (For some TCP implementations, the ACK is already delayed so that a single ACK packet acknowledges more than one data packet—the delay of the invention is imposed when that delayed ACK would normally be transmitted. Thus, the acknowledgments of the invention are called "delay-extended" acknowledgments.)

More specifically, the client 102 calculates a delay factor, D, that will cause subsequent data transmissions by the server 106 to be delayed appropriately to achieve the target bandwidth allocated to the flow. Conceptually, the client 102 uses a model function, M(F, T, P), for predicting the bandwidth consumed by a given flow F, at time T, given a set of parameters P. The parameter set P includes the round-trip time between server 106 and client 102, the segment size being used, the size of the server's congestion window, and perhaps other information about the flow F and the state of the network. The parameter set P also includes the calculated delay factor, D, which is the period of time that each acknowledgment for flow F is delayed. That is, if the most recent acknowledgment for flow F was sent by the client 102 M seconds ago, and under normal circumstances the next acknowledgment is due to be transmitted, that next acknowledgment is delayed instead for M*(D−1) seconds.

The delay slows down the effective data transmission rate of the server 106 below the normal speed of that flow (i.e., B/N, for N flows, in the simple model). In turn, the other, more favored senders of data flows will discover a larger share of the bandwidth B on the bottleneck link, and, as a result, will increase their own transmission rates. When the model and the model inputs are correct, the result will be an accurate allocation of bandwidth among the multiple flows sharing the bottleneck link.

The technique of delaying acknowledgments according to the delay factor D might be subject to inaccuracies because it may be difficult or expensive to compute the desired value for D for each flow. In particular, when the network traffic is primarily a small number of short-lived flows, which are typical of modem Internet use, the calculations of D may be inaccurate for various reasons.

One possible cause of an inaccurate calculation of D is that the source of a short-lived flow may end its transmission. Thus, delaying ACKs on this flow could postpone the time to completion, which might not be an optimal use of resources. Also, short-lived flows are likely to be in their slow-start phase, which increases the complexity of modeling the future behavior of the flow—and not all TCP implementations use the same slow-start algorithms.

Other network conditions can complicate the modeling process: new flows may arrive sharing the bottleneck link; some sending systems have limited buffer size for unacknowledged data, which may reduce their transmission rate below model predictions; network congestion is variable and difficult to predict, as is the resulting loss of data packets, which reduce the bandwidth used by a flow.

Optimum performance occurs, then, when the network traffic is composed primarily or entirely of long-lived flows. Most of such flows are operating in a steady state, and not in slow-start, and because of the dynamics of the congestion-avoidance mechanisms, long-lived flows are less likely than short-lived flows to experience congestion-related packet loss. Also, effects due to limited buffer size on the sending system will be factored into the self-clocking behavior of TCP.

Still, if the network traffic is composed of a large number of flows, it might not be possible to accurately predict the bandwidth used by any one flow. Nonetheless, the average behavior of large classes of flows may be predictable. For example, assume a desired allocation policy is to allocate half of the bandwidth B to the J flows in class A, and other half of the bandwidth to the K flows in class B, measured over periods of several minutes. In this case, although the amount of bandwidth used by a particular flow in class A might not approximate B/(2*J), if no systematic bias exists for flows in either class, the total bandwidth used by all flows in class A should approximate B/2.

Classifying Flows

A more practical approach, then, to calculating a delay factor for each data flow would be to place the data flows into classes and to calculate a delay factor for each class of flow. In so doing, an accurate model M of each flow and accurate information about parameters of that flow are unnecessary, avoiding the above-described complexities associated with developing that model. Instead, feedback-based control would be used to determine the D value for a given class of flows. The D value would apply to all flows placed in that class. Appropriate feedback constants are needed for limiting the rate at which packet acknowledgment delay and/or advertised window is changed.

For instance, a first feedback constant might be used to limit the change in packet acknowledgment delay factor D from one ACK packet to the next as a percentage of delay time. An appropriate value for the first feedback constant might be 0.25, indicating that the delay time should not change by more than 25% from one ACK packet to the next. A second feedback constant might be used to limit changes in the advertised window from one ACK packet to the next. This second feedback constant might be defined as a fraction of the number of bytes in the advertised window. An appropriate value for the second feedback constant might be 0.3, indicating that the advertised window size should not change by more than 30% from one ACK packet to the next. Selection of inappropriate feedback constants may cause the feedback control to either fail to track changes in network conditions (i.e., changes in network congestion), or may cause the computed ACK packet delay factor D, or the computed advertised window, to oscillate.

Successful use of this approach depends on an appropriate division of flows into feedback classes (i.e., classes of flows sharing a feedback-controlled value for D). The following exemplary classes of flows may produce an accurate delay factor for each flow in that class (other classes are possible):

One class for each short-lived flow with a different target bandwidth. For example, all short-lived flows with a target bandwidth of B/1000 would be assigned to one class, all short-lived flows with a target bandwidth of B/500 would constitute another class.

One class for each long-lived flow. Because a long-lived flow is likely to have a stable steady-state behavior, applying feedback control to derive a value for the delay factor D value should be feasible.

One class for each "badly-behaved" flow with a different target bandwidth. A badly-behaved flow is a flow whose observed use of bandwidth significantly exceeds the target bandwidth for its originally assigned class. By isolating badly-behaved flows from well-behaved flows, the bandwidth allocated to badly-behaved flows can be controlled without adversely affecting the well-behaved flows in the same originally-assigned class.

Normally, a data flow would start as a short-lived flow in one of the bandwidth-specific classes. The flow would subsequently terminate or continue long enough to become classified as a long-lived flow. The receiving system would monitor the actual bandwidth consumption of each flow, compare the consumption against the target bandwidth allocated to that flow, and classify that flow as badly-behaved if appropriate.

Increasing the value of D too quickly for individual or classes of flows could lead to false timeouts at the sending system because the adjusting D changes the effective round-trip time and, therefore, the sending system's estimate of when to timeout and retransmit will be too low). Abrupt increases in the value of D should be avoided.

Figure 4:
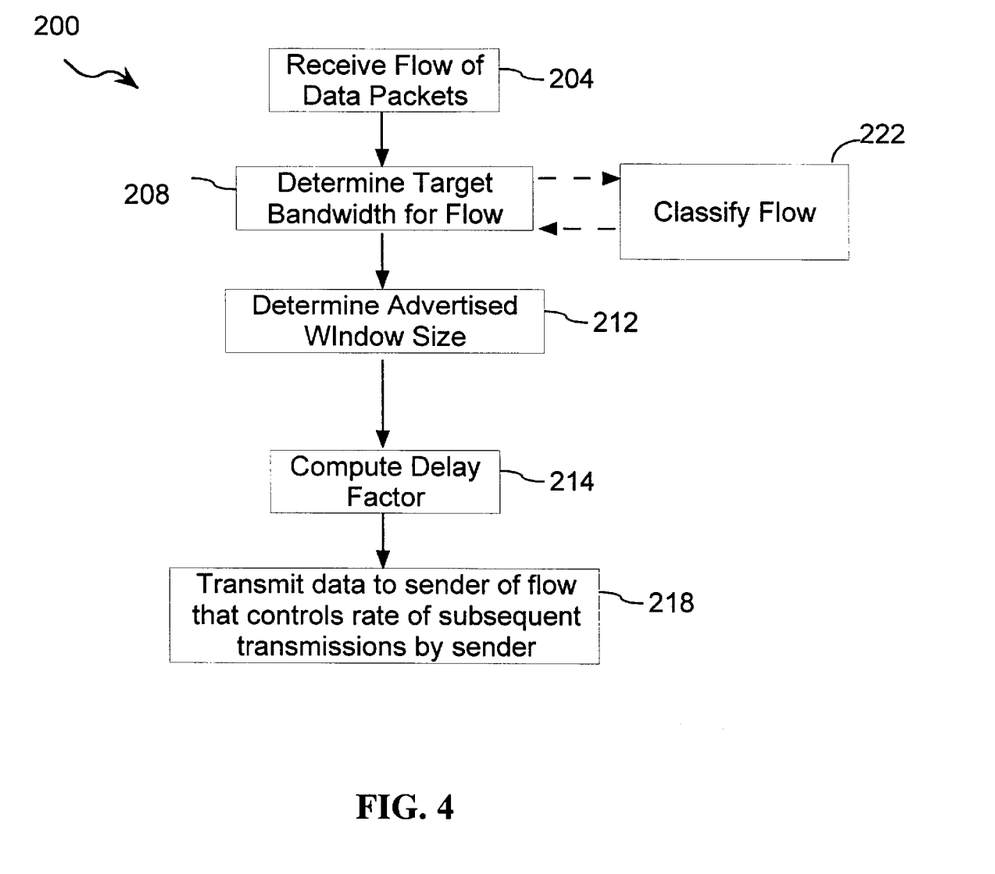
FIG. 4 is a flow chart of an exemplary process of the invention.

FIG. 4 shows an exemplary process 200 executed by the client to allocate bandwidth of a bottleneck link to the server 106 according to the invention. In general overview, the client 102 receives a flow of data packets from the server 106 via the bottleneck link (step 204). The client 102 determines a target bandwidth to be allocated to the server 106 for the data flow on the link (step 208).

In some embodiments, the determination of the target bandwidth is based on the application program associated with the data flow. Alternately, the target bandwidth determination may include assigning the data flow to one of a number of classes (222). The assignment of each data flow to a class may be based on a set of default bandwidth allocation policies as well as policies specified in the configuration file 172 (FIG. 2).

At step 212, the client 102 determines the size of the advertised window. The size limits the amount of data that can be sent by the server 106 when transmitting subsequent data packets to the client 102. As discussed above, while performing step 212 constraints on the rate at which the advertised window may change from one ACK packet to the next may be applied.

At step 214, the client 102 computes a delay factor for delaying the issuing of acknowledgments to the server 106 in response to the flow of data packets. The value of the delay factor is computed such that when the server 106 receives and responds to the acknowledgments and advertised window, the data transmission rate of the server 106 approximates the target bandwidth allocated to the flow. As discussed above, while performing step 214 the process will preferably apply one or more constraints on the rate at which the delay factor may change from one ACK packet to the next.

As discussed above, the target bandwidth for any particular flow may be established either by an application program associated with the flow, or by a set of default policies indicated in a default policy file 170 (FIG. 2).

At step 218, the client 102 transmits the acknowledgments to the server 106 to control the rate of subsequent data transmissions by the server 106. The acknowledgments are delayed according to the delay factor computed in step 214 and include the size of the advertised window.

In another embodiment of the process 200, step 212 is omitted, and data transmission rate of the server 106 is controlled by the rate of the delayed acknowledgments. In yet another embodiment, step 214 is omitted, and the size of the advertised window controls the data transmission rate.

Although described in the context of particular embodiments, one skilled in the art will recognize that the invention can enable many new products and applications in the field of network communications. For example, the manager of a Web proxy server positioned between the Internet and an organization can use the invention to grant priorities to data retrievals requested by various users. Another example is a Web browser with several active windows, one of which is conveying low-priority periodic status updates, and another is used for explicit requests for information. If the browser is connected via a slow link (such as a modem), the invention can be used to give priority to responses to the explicit requests, instead of the status updates.

It will be apparent, therefore, that variations and modifications may be made to the described embodiments, with the attainment of all or some of the advantages. It is the object of the appended claims, therefore, to cover all such variations and modifications as come within the spirit and scope of the invention.

What is claimed is:

1. A method for allocating bandwidth on a communication link in an operating network, comprising the steps of:

receiving a flow of data packets at a receiving system from a sending system on the network via the link;

determining at the receiving system a target bandwidth for the flow on the link;

transmitting data from the receiving system to the sending system in response to the flow of data packets received, the transmitted data providing feedback to the sending system such that when the sending system transmits subsequent data packets to the receiving system, such subsequent data packets are transmitted at a rate approximating the target bandwidth determined by the receiving system; and calculating a period of time for which the receiving system does not transmit data to the sending system.

2. The method of claim 1, wherein a rate at which the transmitted data from the receiving system arrive at the sending system determines the rate at which the sending system transmits the subsequent data packets.

3. The method of claim 1, further comprising the step of:

applying the calculated period of time for which the receiving system does not transmit data to a plurality of flows of a class.

4. The method of claim 1, wherein the data transmitted from the receiving system to the sending system indicates a maximum amount of data that the receiving system will accept from the sending system in a subsequent data transmission.

5. The method of claim 1, wherein the step of calculating the period of time includes using a model of the network.

6. The method of claim 1, further comprising the steps of measuring a bandwidth of the link being used by a class of flows, and using the measured bandwidth as feedback for calculating the period of time.

7. The method of claim 1, wherein the data transmitted by the receiving system to the sending system includes acknowledgment of receipt of a particular data packet in the flow of data packets.

8. The method of claim 1, wherein the target bandwidth is determined by a network protocol process.

9. The method of claim 1, wherein when the link is idle, the target bandwidth equals a full bandwidth of the link.

10. A method for allocating bandwidth on a communication link in an operating network, comprising the steps of:
   receiving a flow of data packets at a receiving system from a sending system on the network via the link;
   determining at the receiving system a target bandwidth for the flow on the link; and
   transmitting data from the receiving system to the sending system in response to the flow of data packets received, the transmitted data providing feedback to the sending system such that when the sending system transmits subsequent data packets to the receiving system, such subsequent data packets are transmitted at a rate approximating the target bandwidth determined by the receiving system;
   wherein the flow is initially assigned to a first class of flows, and is subsequently assigned to a second class of flows when the flow continues for longer than a predetermined period of time; the target bandwidth comprising a first target bandwidth for flows in the first class and a second target bandwidth for flows in the second class.

11. The method of claim 10, further comprising the step of:
   assigning the flow to a third class of flows when the flow uses substantially more bandwidth than the target bandwidth allocated to that flow while in the second class of flows.

12. A method for allocating bandwidth on a communication link in an operating network, comprising the steps of:
   receiving flows of data packets at a receiving system from sending systems on the network via the link;
   determining at the receiving system a target bandwidth for the flows on the link;
   transmitting data to the sending systems that will cause the sending systems to transmit subsequent data packets to the receiving system at a rate approximating the target bandwidth for the flows of data packets from the sending systems; and
   for each flow of at least a subset of the flows, calculating a period of time for which the receiving system does not transmit data to the sending system.

13. A computer system for allocating bandwidth on a communication link in an operating network, comprising:
   a network interface for receiving a flow of data packets from a sending system on the network via the link; and
   a processor coupled to the network interface for determining a target bandwidth for the flow on the link, the network interface transmitting data to the sending system in response to the flow of data packets received, the transmitted data providing feedback to the sending system such that the sending system transmits subsequent data packets at a rate approximating the target bandwidth for the flow when responding to the transmitted data;
   wherein the processor is configured to calculate a period of time for which the receiving system does not transmit data to the sending system.

14. The computer system of claim 13, further comprising:
   memory, coupled to the processor, configured to store a model of a behavior of the network that is used when calculating a period of time for which the receiving system does not transmit data to the sending system.

15. The computer system of claim 13, wherein the processor is configured to assign the flow to a class of flows; and wherein a calculated period of time for which the receiving system does not transmit data to the sending system applies to the flows in said class.

16. The computer system of claim 13, wherein the system is configured to measure a bandwidth of the link being used by a class of flows and to calculate, based on the measured bandwidth, a period of time for which the receiving system does not transmit data to the sending system.

17. The computer system of claim 13, wherein the data transmitted from the receiving system to the sending system include a maximum amount of data that the receiving system will accept from the sending system in a subsequent data transmission.

18. The computer system of claim 13, wherein the target bandwidth is determined by an application program that receives the flow of data packets.

19. A method for allocating bandwidth on a communication link in an operating network, comprising the steps of:
   receiving a flow of data packets at a receiving system from a sending system on the network via the link;
   determining at the receiving system a target bandwidth for the flow on the link; and
   transmitting data from the receiving system to the sending system in response to the flow of data packets received, the transmitted data providing feedback to the sending system such that when the sending system transmits subsequent data packets to the receiving system, such subsequent data packets are transmitted at a rate approximating the target bandwidth determined by the receiving system; and
   calculating and applying a period of time for which the receiving system does not transmit data to a plurality of flows of a class;
   wherein the target bandwidth is determined by an application program that receives the flow of data packets.

20. The method of claim 19, wherein the step of calculating the period of time includes using a model of the network.

21. The method of claim 19, further comprising the steps of measuring a bandwidth of the link being used by a class of flows, and using the measured bandwidth as feedback for calculating the period of time.

22. A method for allocating bandwidth on a communication link in an operating network, comprising the steps of:
   receiving a flow of data packets at a receiving system from a sending system on the network via the link;
   determining at the receiving system a target bandwidth for the flow on the link; and
   transmitting data from the receiving system to the sending system in response to the flow of data packets received, the transmitted data providing feedback to the sending system such that when the sending system transmits subsequent data packets to the receiving system, such subsequent data packets are transmitted at a rate approximating the target bandwidth determined by the receiving system;
   wherein
      the target bandwidth is determined by an application program that receives the flow of data packets; and
      the flow is initially assigned to a first class of flows, and is subsequently assigned to a second class of flows when the flow continues for longer than a predetermined period of time; the target bandwidth comprising a first target bandwidth for flows in the first class and a second target bandwidth for flows in the second class.

23. The method of claim 22, further comprising the step of:

assigning the flow to a third class of flows when the flow uses substantially more bandwidth than the target bandwidth allocated to that flow while in the second class of flows.

24. A method for allocating bandwidth on a communication link in an operating network, comprising the steps of:

receiving a flow of data packets at a receiving system from a sending system on the network via the link;

determining at the receiving system a target bandwidth for the flow on the link; and transmitting data from the receiving system to the sending system in response to the flow of data packets received, the transmitted data providing feedback to the sending system such that when the sending system transmits subsequent data packets to the receiving system, such subsequent data packets are transmitted at a rate approximating the target bandwidth determined by the receiving system;

wherein the target bandwidth is determined by an application program that receives the flow of data packets; and the data transmitted by the receiving system to the sending system includes acknowledgment of receipt of a particular data packet in the flow of data packets.

* * * * *